United States Patent
Nair et al.

(10) Patent No.: US 9,479,487 B2
(45) Date of Patent: Oct. 25, 2016

(54) SECURITY KEY GENERATION FOR SIMULTANEOUS MULTIPLE CELL CONNECTIONS FOR MOBILE DEVICE

(71) Applicant: Alcatel Lucent, Boulogne Billancourt (FR)

(72) Inventors: Suresh P. Nair, Whippany, NJ (US); Semyon B. Mizikovsky, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/088,784

(22) Filed: Apr. 1, 2016

(65) Prior Publication Data
US 2016/0219025 A1  Jul. 28, 2016

Related U.S. Application Data

(63) Continuation of application No. 14/265,987, filed on Apr. 30, 2014, now Pat. No. 9,338,136.

(60) Provisional application No. 61/912,311, filed on Dec. 5, 2013.

(51) Int. Cl.
*H04L 29/06* (2006.01)
*H04W 12/04* (2009.01)

(52) U.S. Cl.
CPC ............. *H04L 63/062* (2013.01); *H04L 63/10* (2013.01); *H04W 12/04* (2013.01)

(58) Field of Classification Search
None
See application file for complete search history.

(56) References Cited

U.S. PATENT DOCUMENTS

2004/0213279 A1  10/2004  Kusaki et al.

2011/0122843 A1  5/2011  Iwamura et al.
(Continued)

FOREIGN PATENT DOCUMENTS

| WO | 2013097672 A1 | 7/2013 |
| WO | 2013116976 A1 | 8/2013 |
| WO | PCT/US2014/065379 | 11/2014 |

OTHER PUBLICATIONS

3GPP, "3rd Generation Partnership Project; Technical Specification Group Services and System Aspects; 3GPP System Architecture Evolution (SAE); Security Architecture (Release 13)," 3GPP TS 33.401 V13.2.0, Mar. 2016 (146 pages).

(Continued)

*Primary Examiner* — Michael R Vaughan
(74) *Attorney, Agent, or Firm* — Ryan, Mason & Lewis, LLP

(57) ABSTRACT

A first security context is established between a given user computing device and a first network computing device to enable a secure data connection between the given user computing device and the first network computing device. A second security context is established between the given user computing device and a second network computing device to enable a secure data connection between the given user computing device and the second network computing device simultaneous with the secure data connection between the given user computing device and the first network computing device. Establishment of the second security context includes the first network computing device sending the given user computing device a simultaneous secure data connection parameter useable by the given user computing device to establish the second security context with the second network computing device.

20 Claims, 6 Drawing Sheets

(56) References Cited

U.S. PATENT DOCUMENTS

| | | | |
|---|---|---|---|
| 2012/0244865 A1* | 9/2012 | Iwamura | H04W 12/04 455/437 |
| 2013/0189996 A1 | 7/2013 | Sridhar et al. | |
| 2013/0288685 A1* | 10/2013 | Zhang | H04W 8/20 455/436 |
| 2014/0308921 A1 | 10/2014 | Zhang | |
| 2015/0111580 A1 | 4/2015 | Wu | |
| 2015/0146562 A1 | 5/2015 | Sivanesan et al. | |
| 2015/0173047 A1 | 6/2015 | Yamada | |
| 2015/0263836 A1* | 9/2015 | Kim | H04B 7/024 370/329 |
| 2015/0312943 A1* | 10/2015 | Zhang | H04W 74/0833 370/331 |

OTHER PUBLICATIONS

3GPP, "3rd Generation Partnership Project; Technical Specification Group Services and System Aspects; 3GPP System Architecture Evolution (SAE); Security Architecture (Release 12)," 3GPP TS 33.401 V12.10.0, Dec. 2013, 121 pages.

3GPP, "3rd Generation Partnership Project; Introduction of Carrier Aggregation;Source: Rapporteur (Samsung)," TSG RAN WG2 #71 R2-104516, Madrid, Spain, Aug. 2010, 74 pages.

3GPP, "3rd Generation Partnership Project; Technical Specification Group Services and System Aspects; Generic Authentication Architecture (GAA); Generic Bootstrapping Architecture (GBA) (Release 12)," 3GPP TS 33.220 V12.2.0, Dec. 2013, 92 pages.

* cited by examiner

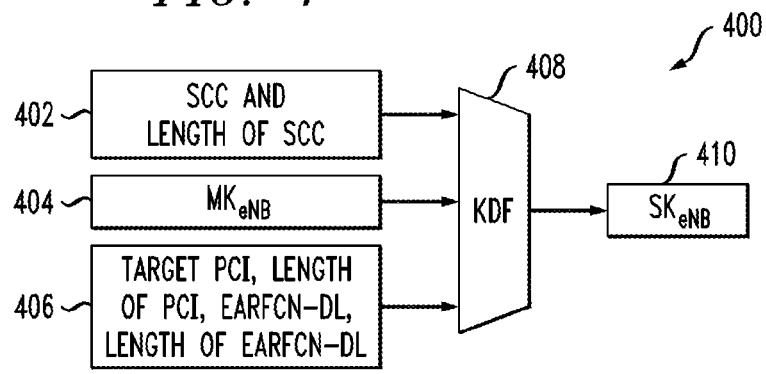
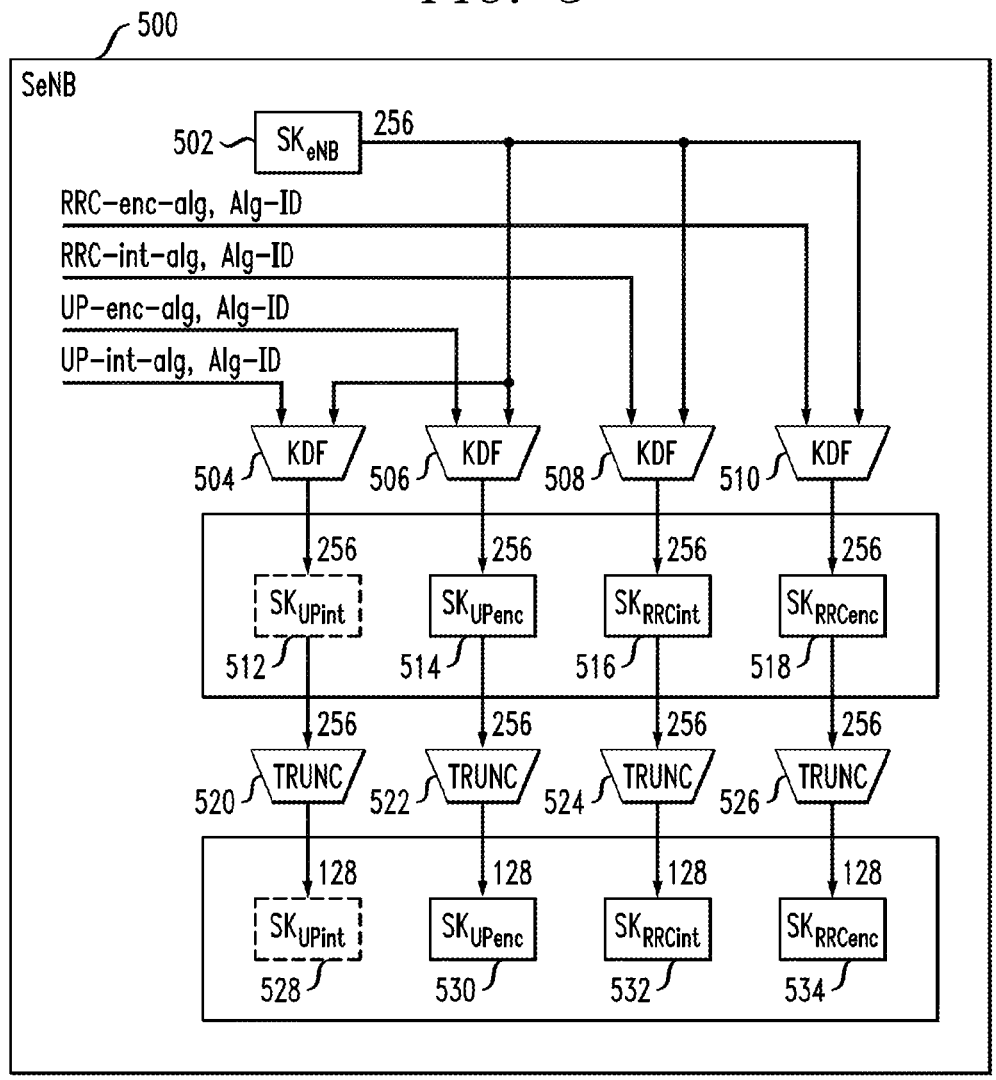

SECURITY KEY GENERATION FOR SIMULTANEOUS MULTIPLE CELL CONNECTIONS FOR MOBILE DEVICE

The present application is a continuing application of U.S. patent application Ser. No. 14/265,987, filed on Apr. 30, 2014, which claims priority to the U.S. provisional patent application identified by Ser. No. 61/912,311, entitled "Security Key Generation for Simultaneous Multiple Cell Connections for Mobile Device," filed on Dec. 5, 2013, the disclosures of which are incorporated by reference herein in their entirety.

FIELD

The application relates generally to communication networks, and more particularly to communication protocols providing security context establishment functionality.

BACKGROUND

The 3rd Generation Partnership Project (3GPP) is currently defining parameters for the provision of dual connectivity to User Equipment (UE) of a mobile device in a Long Term Evolution (LTE) communication network. The evolved architecture of the LTE network comprises an Evolved Universal Terrestrial Radio Access Network (E-UTRAN) on the access network side and an Evolved Packet Core (EPC) on the core network side.

In dual connectivity, the UE consumes radio resources provided by at least two different network access points (Master and Secondary eNBs) connected via a non-ideal backhaul (where eNB refers to an Evolved Node B network access point in the LTE network). The Master (or Macro) eNB (MeNB) is the eNB which hosts the Radio Resource Control (RRC) layer and terminates S1-MME (reference point for the control plane protocol between E-UTRAN and a Mobility Management Entity (MME)), and which therefore acts as a mobility anchor towards the Core Network (CN). The Secondary (or Small) eNB (SeNB) is an eNB which provides additional radio resources for the UE. The eNB configured as an SeNB for a given UE can also be operated as a typical cell (i.e., single connectivity) for standalone UEs.

The current 3GPP security framework defines secure operation between the UE and one point of attachment, i.e., between the UE and one eNB. However, there is no existing security solution for simultaneous connection of the UE to multiple cells.

SUMMARY

Illustrative embodiments of the invention provide improved security context establishment techniques for use in a communication network.

In one embodiment, a method includes the following steps. A first security context is established between a given user computing device and a first network computing device to enable a secure data connection between the given user computing device and the first network computing device. At least a second security context is established between the given user computing device and at least a second network computing device to enable a secure data connection between the given user computing device and the second network computing device simultaneous with the secure data connection between the given user computing device and the first network computing device. Establishment of the second security context includes the first network computing device sending the given user computing device a simultaneous secure data connection parameter useable by the given user computing device to establish the second security context with the second network computing device, wherein the simultaneous secure data connection parameter comprises a counter that is set to a unique predetermined value for the second network computing device to enable the given user computing device to establish a unique security context for the secure data connection with the second network computing device.

For example, a security key for the second security context may be computed using a key derivation function based on a security key established for the first security context and the simultaneous secure data connection parameter.

Advantageously, illustrative embodiments provide security solutions for simultaneous connection of a UE to multiple cells in a communication network.

These and other features and advantages of the present invention will become more apparent from the accompanying drawings and the following detailed description.

BRIEF DESCRIPTION OF THE DRAWINGS

FIG. 4 shows a methodology for key computation by a primary access point according to an embodiment of the invention.

FIG. 5 shows a methodology for key computations by a secondary access point according to an embodiment of the invention.

DETAILED DESCRIPTION

Illustrative embodiments of the invention will be described herein with reference to exemplary communication networks, user computing devices, network computing devices, processing platforms, and associated communication protocols. It should be understood, however, that embodiments of the invention are not limited to use with the particular arrangements described, but are instead more generally applicable to any communication network application in which it is desirable to provide improved security context establishment functionality.

Figure 1A:
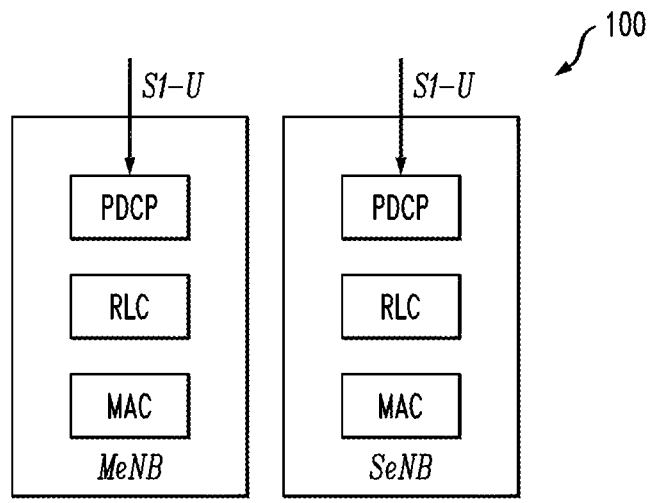
FIGS. 1A and 1B show illustrative 3GPP interface architectures for user equipment connecting to two different network access points.
Figure 1B:
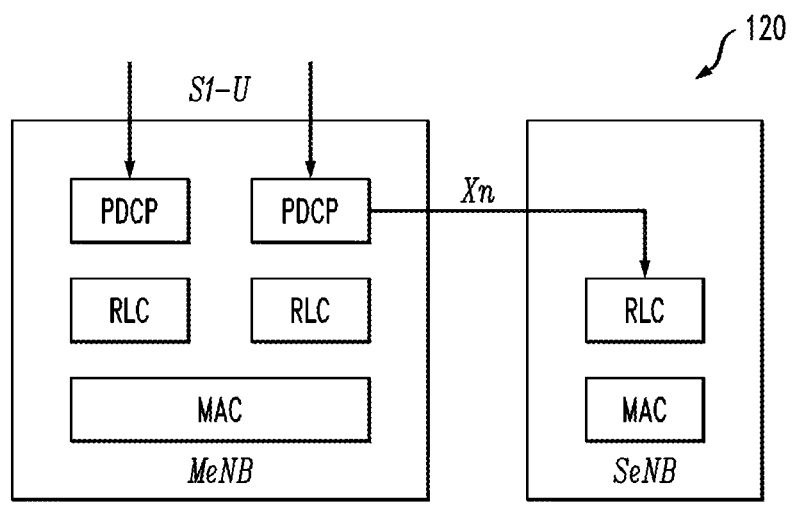

FIGS. 1A and 1B show illustrative 3GPP interface architectures for user equipment connecting to two different network access points (MeNB and SeNB) associated with a dual connectivity arrangement.

In general, an eNB interfaces with the UE and hosts the Physical (PHY), Medium Access Control (MAC), Radio Link Control (RLC), and Packet Data Control Protocol (PDCP) layers. The eNB also hosts Radio Resource Control (RRC) functions corresponding to the control plane, and performs, inter alia, ciphering/deciphering of user and control plane data. The S1-U interface is a reference point between the E-UTRAN and a Serving Gateway (GW) for per bearer user plane tunneling and inter eNB path switching during handover.

In both architectures shown in FIGS. 1A (100) and 1B (150), the user plane data is crypto-processed, i.e., encrypted and decrypted, at the PDCP layer associated with either the MeNB or the SeNB allocated by the MeNB, while the UE maintains simultaneous user plane connections with both MeNB and SeNB.

As mentioned above in the background section, current 3GPP security framework defines secure operations between the UE and one point of attachment (i.e., only one eNB), and thus there is no existing security solution for simultaneous connection of the UE to multiple cells.

According to the current 3GPP specification TS 33.401, the disclosure of which is incorporated herein by reference in its entirety, a fresh key $K_{eNB}$ is computed every time a UE makes a connection to an eNB. From $K_{eNB}$, a set of keys for integrity and ciphering protection of the user plane and the control plane are computed. During handoff, $K_{eNB}^*$ is computed from the current $K_{eNB}$ for the target eNB by the network. Once delivered by the serving eNB to the target eNB, the $K_{eNB}^*$ becomes the current active $K_{eNB}$ for the target eNB. The UE also makes a similar computation of $K_{eNB}$ for the target cell from mutually known parameters. If the $K_{eNB}$s of UE and the target eNB match, then the handoff is successful. Subsequent to handoff to a new target eNB, integrity and ciphering keys for the control and user planes are re-computed. However, current single security context established between the UE and one eNB is not sufficient to support simultaneous multiple cell connections.

It is realized that it is not desirable for a single security context to be used by multiple cells to prevent potential security vulnerabilities. Accordingly, embodiments of the invention provide security solutions with individual (separate) security contexts for the simultaneous connections to multiple cells (eNBs) by a UE. That is, each connection has its own separate security context. For example, embodiments provide key computation and key management methodologies for multiple simultaneous connections to eNBs (e.g., MeNB and SeNB) by a UE. The methodologies are applicable to many scenarios such as, but not limited to, hierarchical cells, small cells deployed within a macro cell, etc. Furthermore, embodiments of the invention do not affect the current key computation schemes defined by TS 33.401 during initial access, handover, etc. That is, embodiments of the invention define a new key derivation methodology where generation of multiple security contexts is possible without adversely altering the current TS 33.401 scheme and while maintaining robustness of the key computation. For example, one or more illustrative embodiments use a parameter referred to as small cell counter (SCC) and a new key derivation function to compute an additional security context whenever a new target cell is added for simultaneous connection for a UE. The SCC parameter is also more generally referred to as a simultaneous secure data connection parameter.

For example, in an illustrative embodiment which will be explained in further detail below, when an MeNB adds an SeNB for simultaneous connection for the UE, MeNB sends to the UE (along with other parameters to be explained) a small cell counter (SCC) parameter. SCC is maintained by an MeNB as part of its UE context and is a monotonically increasing counter which starts with an initial value m and is incremented to a value m+1 for the first cell added, and then incremented (e.g., m+2, m+3, m+4, . . . etc.) each time another small cell is added for the UE. If the MeNB decides to turn off the simultaneous connection (e.g., due to the mobility of UE) and later decides to re-start the offloading to the same SeNB, the SCC value only keeps increasing, thus keeping the computed security context fresh. Thus, by way of example, the counter value starts initially at 0, and then increments to 1 when the first small cell is added, then increments to 2 when the next small cell is added, and so on. Also, in other embodiments, the counter increments can be greater than one.

In an alternative embodiment, SCC can be a monotonically decreasing counter starting from some initial value m and decremented each time a small cell is added for the UE (e.g., m−1, m−2, m−3, . . . etc.). It is to be appreciated that the counter can be started at any value m so long as it is changed to a unique predetermined value for each small cell that is added. Furthermore, the simultaneous secure data connection parameter can comprise any randomly selected value which does not repeat during a lifetime of the same $K_{eNB}$ so as to provide a unique value for each added security context. A large random number can be used, for example, with a very low (negligible) probability of repetition.

When an MeNB decides to add a small cell SeNB for data offloading for a given UE connected to the MeNB, the MeNB sends the target cell a request message for the offload connection. The initiating cell MeNB calculates the key to be used, $SK_{eNB}$, for the UE connection in the target SeNB.

In an illustrative embodiment, to adapt the key derivation procedure defined in 3GPP TS 33.401, security key $SK_{eNB}$ is derived as the $KDF(K_{eNB}, S)$. $K_{eNB}$ is the currently active key of the MeNB (denoted as $MK_{eNB}$) and the KDF is the key derivation function defined in 3GPP TS 33.220 annex B, the disclosure of which is incorporated herein by reference in its entirety with a new function code FC. In the illustrative embodiment, the S parameter is derived using the SCC, the length of SCC, and other SeNB cell-specific parameters such as: target PCI, length of PCI, EARFCN-DL, and length of EARFCN-DL, where PCI refers to Physical Cell Identifier, EARFCN refers to E-UTRA Absolute Radio Frequency Channel Number, and DL refers to downlink. The S parameter is a string that is constructed from n+1 input parameters as follows: S=FC || P0 || L0 || P1 || L1 || P2 || L2 || . . . || Pn || Ln, an example of which will be given below according to the illustrative embodiment. Note that the other SeNB cell-specific parameters (target PCI, length of PCI, EARFCN-DL, and length of EARFCN-DL) are not used in alternative embodiments.

When UE is instructed to make a connection request to the target SeNB, the UE also is given the same SCC, length of SCC and (when used) other target cell parameters: target PCI, length of PCI, EARFCN-DL, and length of EARFCN-DL. The UE computes the S parameter using the new function defined below and further computes $SK_{eNB}$ using the same key derivation function $KDF(K_{eNB}, S)$.

It is to be understood that alternative embodiments can use a key derivation function other than the KDF defined in 3GPP TS 33.401. By way of example only, any one-way cryptographic function, such as a hash function, with suitable message authentication code (MAC) properties can be used, e.g., secure hash algorithms such as SHA1, SHA256, SHA3, etc.

From $SK_{eNB}$, the UE derives further keys for integrity and ciphering, i.e., $SK_{UPint}$ (user plane integrity key), $SK_{UPenc}$ (user plane encryption key), $SK_{RRCint}$ (RRC integrity key) and $SK_{RRCenc}$ (RRC encryption key), for the target cell. Such keys include uplink (UL) keys and downlink (DL) keys.

That is, at the UE, the DL keys are used for decryption when receiving data, and UL keys are used for encryption when sending data.

Depending on architectural choices, the SeNB may or may not be able to process the control plane RRC messages. When the SeNB can process the RRC messages, this is indicated to the UE in the offload command from the MeNB. In this case, the "offload connection request" message from the UE, which is the first RRC message from the UE to the SeNB, is integrity-protected using the $SK_{RRCint}$ key. Integrity verification of this message is done by the SeNB and signifies that the UE computed the correct $SK_{eNB}$, as well as all its subordinate keys for encryption and integrity protection.

When the SeNB cannot process the RRC messages, the correct computation of the $SK_{eNB}$ in the UE can only be ensured by the MeNB. To allow this, at least the following approaches can be used:

(1) The UE can send the RRC message to the MeNB. This message contains the verification payload as a hash of, for example, $SK_{RRCint}|SK_{RRCenc}$ (i.e., the subordinate keys not used for this connection, but still computationally aligned with $SK_{UPenc}$ that needs to be verified). This message is integrity-protected using the $MK_{RRCint}$.

(2) The UE can send the same verification payload as a part of a user plane message directed towards the Offload PDCP associated with the SeNB Radio Link Control (RLC) layer. The PDCP then has to distinguish between a normal user plan payload and a verification payload, and process the verification payload accordingly to validate that the keys computed by the UE are correct.

(3) The UE can alternatively communicate acceptance of the offload command back to the MeNB using the secure RRC signaling, based on the security association between the UE and the MeNB. This signaling implicitly indicates to the MeNB that the SCC value has been received and accepted for computation of the $SK_{eNB}$. In this alternative, the MeNB does not verify correct computation of the $SK_{eNB}$, but gets assurance that all necessary parameters for correct computation of the $SK_{eNB}$ are provided to the UE.

The SeNB also computes the user plane integrity and ciphering keys $SK_{UPint}$ and $SK_{UPenc}$ to be used by the UE based on the $SK_{eNB}$ it received from MeNB. After successful connection establishment, ciphering key $SK_{UPenc}$ is used for the user plane encryption in the target cell SeNB. If user plane integrity is turned on, the $SK_{UPint}$ is used for integrity check.

An illustrative call flow for this offload establishment showing the key computation is depicted below in FIG. 2, and will be further described below.

First, we will describe an illustrative embodiment of the $SK_{eNB}$ derivation function depicted in FIG. 4.

The following parameters are used to form the input S to the KDF in order to derive the $SK_{eNB}$ from the current $K_{eNB}$ of MeNB ($MK_{eNB}$):

FC=0xNN (next available consecutive code assignment, e.g., 0x1C new function code for $SK_{eNB}$ derivation);
P0=SCC (Small Cell Counter);
L0=length of SCC (n bits, where n is application-specific);
P1=EARFCN-DL (target physical cell downlink frequency);
L1=length of EARFCN-DL (e.g., 0x00 0x02);
P2=PCI (target physical cell identifier); and
L2=length of PCI (e.g., 0x00 0x02).

In this embodiment, the input key is the current 256-bit $K_{eNB}$ and S=FC || P0 || L0 || P1 || L1 || P2 || L2. Note that while parameters P1, L1, P2, and L2 are used in the illustrative embodiment described herein, in alternative embodiments, one or more of these parameters may be excluded.

Figure 3:
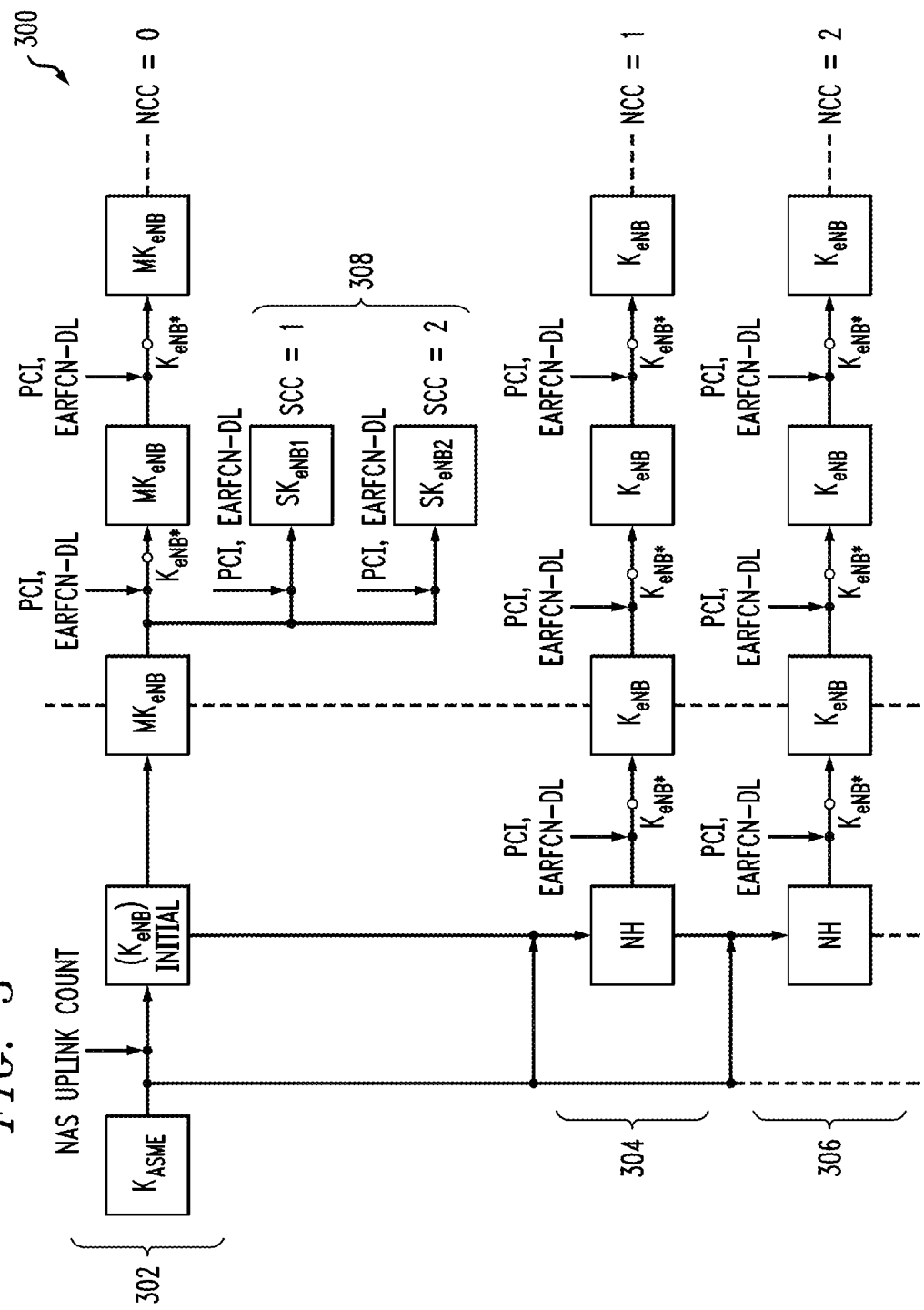
FIG. 3 shows a model for key chaining with simultaneous multiple secure cell connections according to an embodiment of the invention.

With the new key computation methodology according to this illustrative embodiment of the invention, the overall key chaining may be illustrated as shown in FIG. 3, which will be further described below.

The new function according to this illustrative embodiment of the invention independently works without altering the current use of {NH, NCC} pair during handoff, where NH refers to the Next Hop parameter, and NCC refers to the NH Chaining Counter parameter. With the addition of SCC, the new set of key computation parameters becomes {NH, NCC, SCC}. For simultaneous connection, UE keeps multiple keys computed for the cells with which it established simultaneous connection.

The SCC value is reset to its initial value (e.g., SCC=0) at the MeNB and the UE when the UE context is deleted due to S1, X2 handoff or network exit of the UE. When the UE enters the network with another security context, i.e., another $MK_{eNB}$, the SCC is restarted from its initial value plus one increment (e.g. SCC=1) for the first allocation of the SeNB.

In one embodiment, the SeNB retains the SCC value even if it is de-allocated for this UE connection. When it is allocated again, the SeNB checks the key identity of the $SK_{eNB}$ which is the same as the key identity of the associated $MK_{eNB}$ from which it is computed. For the same key identity, the SeNB expects the SCC provided by the MeNB to be larger than that used before. For the different key identity, the SeNB resets the SCC to the initial value provided by the MeNB.

Note that this illustrative methodology allows simultaneous multiple connections to more than one cell controlled by an MeNB. The key hierarchy supports multiple connections if so decided by the MeNB.

Also this illustrative methodology does not depend on any direct MME input, i.e., the methodology is locally managed by a controlling cell MeNB.

This illustrative embodiment which is an improvement of the current key computation scheme in 3GPP maintains one of the key design principles, i.e., keep the computation forward security keys and backward security keys intact.

Figure 2:
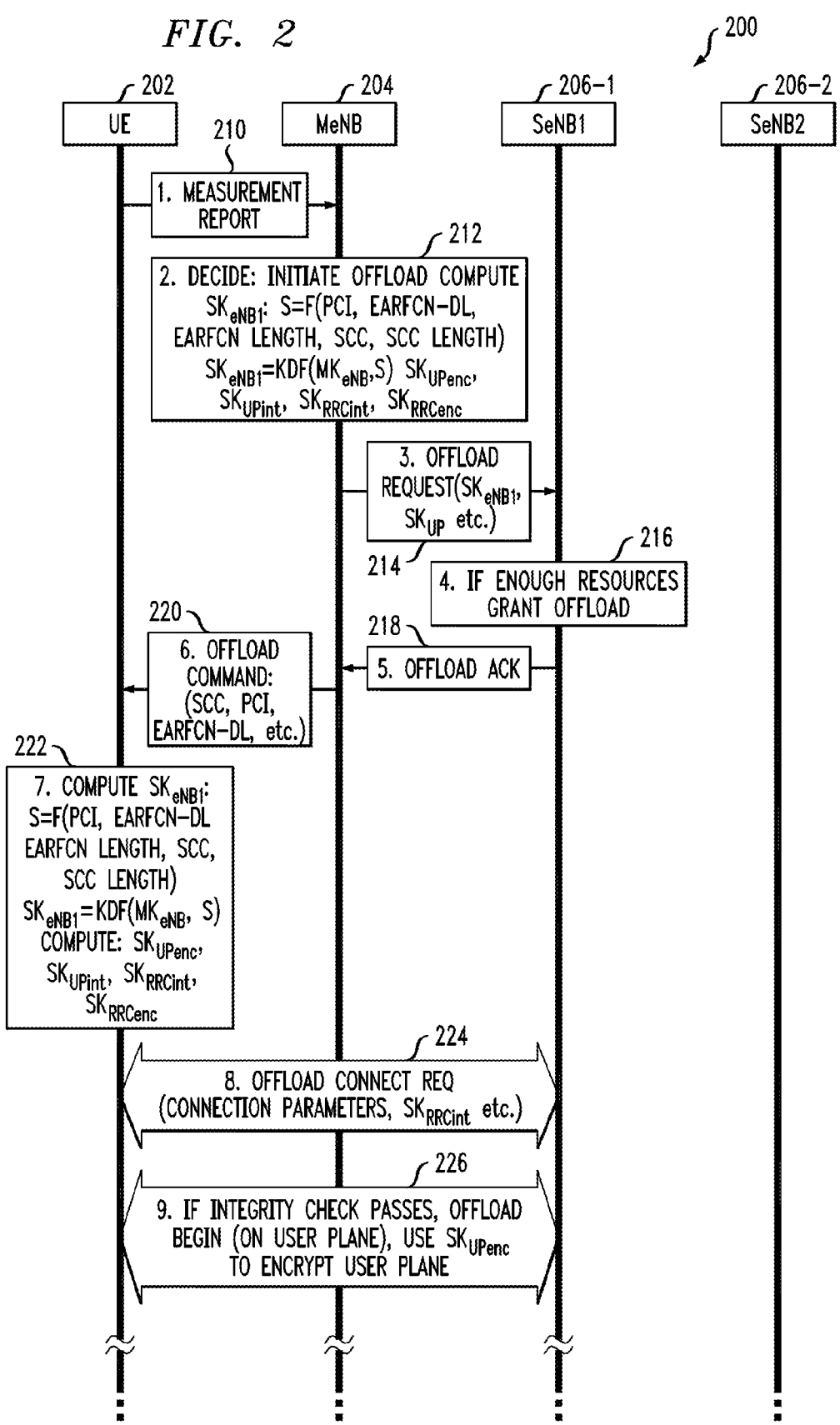
FIG. 2 shows a methodology for establishing simultaneous multiple secure cell connections according to an embodiment of the invention.
Figure 2:
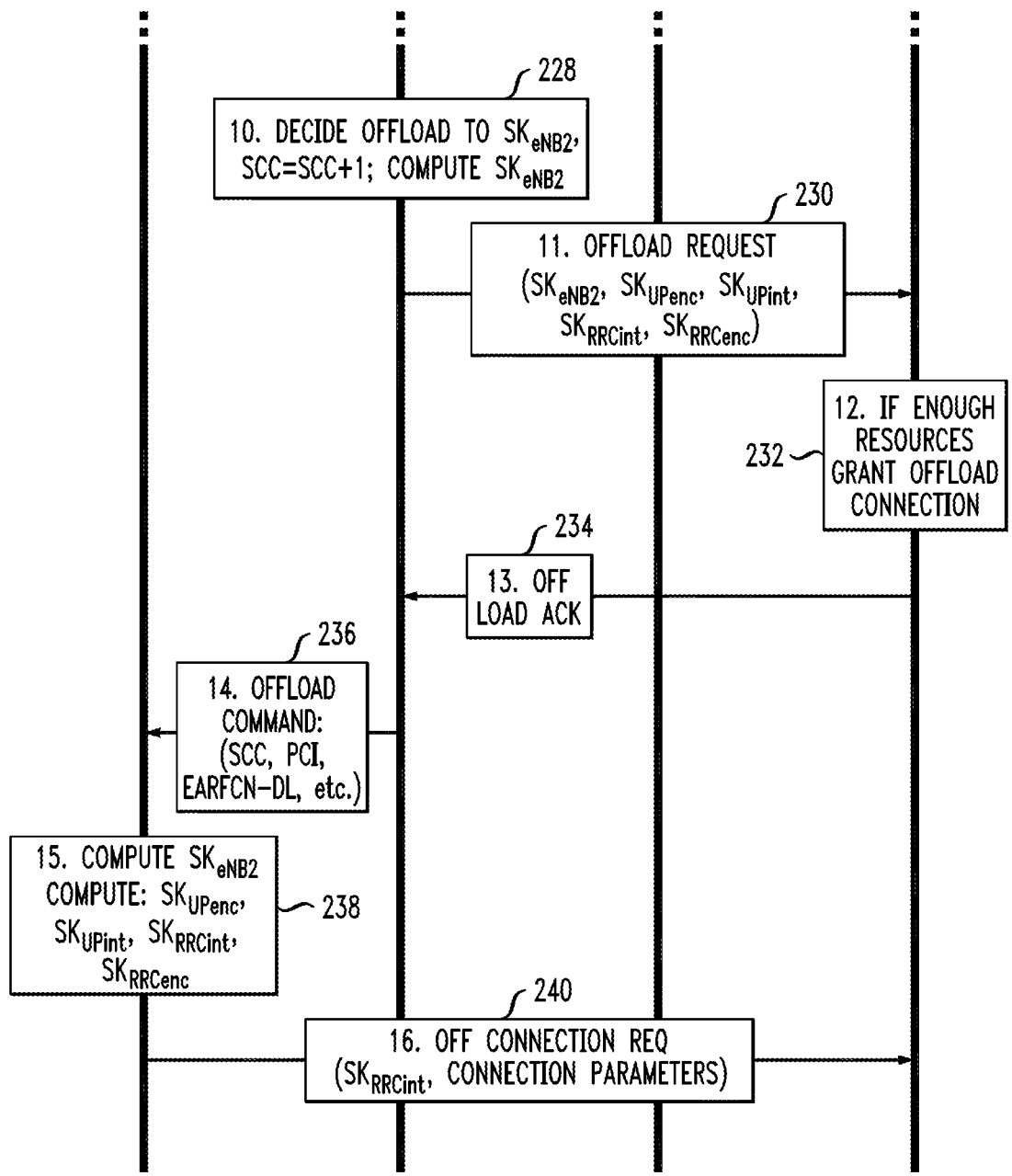

FIG. 2 shows a methodology 200 for establishing simultaneous multiple secure cell connections according to an embodiment of the invention. The illustrative methodology shows the exemplary use of illustrative steps without direct reference to specific message nomenclature of 3GPP standards and procedures.

Step 1 (210): UE 202 sends a measurement report to MeNB 204 showing SeNB1 206-1. That is, the measurement report indicates that UE 202 is within suitable access range of SeNB1 206-1.

Step 2 (212): MeNB 204 decides to start multiple connections for offloading. MeNB 204 computes the key, $SK_{eNB}1$, to be used for the connection. Other keys to be used at the target SeNB1, ($SK_{UP\ enc}$, $SK_{UP\ int}$, $SK_{RRC\ int}$, $SK_{RRC\ enc}$, etc.) are also calculated by the MeNB, and delegated to the SeNB for calculation.

Step 3 (214): MeNB 204 sends offload request to the target SeNB1 206-1. The offload request contains these parameters and UE ID (identifier), and any other parameters for connection establishment. Security parameters and other connection parameters may be sent in different messages also based on the exact call flow decided and the message content.

Step 4 (216): SeNB1 206-1 verifies whether it has enough resources to grant the offload connection for the UE 202.

Step 5 (218): SeNB1 206-1 sends an offload acknowledge message to MeNB 204.

Step 6 (220): MeNB 204 instructs UE 202 to connect to a target SeNB1 206-1 for offloading with parameters (SCC, PCI, EARFCN-DL, etc.). Other parameters known to be used to connect to the SeNB1 206-1 can also be sent to the UE 202.

Step 7 (222): UE 202 computes $SK_{eNB}1$ and user plane keys for integrity and ciphering for the target cell SeNB1.

Step 8 (224): UE 202 makes an offload connection request to the target SeNB1 206-1. As decided by the call flow and exact messages, in one embodiment, this includes a connection request phase, UE authentication phase and user plane establishment. Connection parameters given by the MeNB 204 are used to request the physical connection at SeNB1 206-1. The $SK_{RRC\,int}$ is used to integrity protect the message to verify the authenticity of the UE 202. In another variation, the UE 202 sends the RRC message to the MeNB 204 containing the verification payload as described above. The message is signed by the $MK_{RRCInt}$ key associated with the MeNB 204. Upon validation of this message and confirming correctness of the verification payload, the MeNB 204 informs the SeNB1 206-1 that the $SK_{eNB}$ and its subordinate keys are properly established at the UE 202.

Step 9 (226): SeNB1 206-1, in at least one illustrative embodiment, verifies the connection parameters and authenticity of UE 202, if the SeNB is equipped with the RRC functionality. After UE verification, an offload bearer is setup at both UE 202 and SeNB1 206-1. Both UE 202 and SeNB1 206-1 begin user plane data offload. User data is encrypted using the encryption key $SK_{UPEnc}$.

Steps 10-15 (228-240): If MeNB 204 decides to allocate another simultaneous connection for the UE 202 with SeNB2 206-2, MeNB 204 increments the SCC, and repeats the key computation and connection procedure as described in steps 1-9 (i.e., steps 228, 230, 232, 234, 236, 238 and 240 for SeNB2 206-2 respectively correspond to steps 212, 214, 216, 218, 220, 222 and 224 for SeNB1 206-1).

FIG. 3 shows a model for key chaining with simultaneous multiple secure cell connections according to an embodiment of the invention. As described above, the multiple cell connection functionality according to this illustrative embodiment of the invention independently works without altering the current use of {NH, NCC} pair during handoff. With the addition of SCC, the new set of key computation parameters becomes {NH, NCC, SCC}. For simultaneous connection, the UE keeps multiple keys computed for the cells with which it established simultaneous connection. FIG. 3 shows the key chaining 300 with the new $SK_{eNB}$ computation in the hierarchy of target cell key ($K_{eNB}$) during a handoff.

Currently, 3GPP allows a horizontal key derivation scheme and a vertical key derivation scheme using {NH, NCC} values. As shown in FIG. 3, 302 represents the initial (horizontal) key derivation process (NCC=0), while 304 and 306 represent (horizontal) key derivation processes for a first handoff (NCC=1) and a second handoff (NCC=2), respectively. The vertical key derivation scheme provides that an additional horizontal key derivation process is performed, based on an initial $K_{eNB}$ which is computed from $K_{ASME}$ (in eUTRAN, the MME serves the role of Access Security Management Entity (ASME)) for each subsequent incrementation of the Non-Access Stratum (NAS) uplink count.

Keys for simultaneous connection, $SK_{eNB}$s, as depicted by 308 in FIG. 3, do not alter the calculation, management and behavior of the existing $K_{eNB}$ keys. The current $K_{eNB}$, when a simultaneous connection is initiated and the $SK_{eNB}$ is calculated, is shown as $MK_{eNB}$. Integrity and ciphering keys to be used in a simultaneous connection, e.g., $SK_{UPEnc}$, $SK_{UPInt}$, $SK_{RRCEnc}$, $SK_{RRCInt}$, are derived from this key. Based on the process or UE message, these keys may be used as needed for UE connection establishment, integrity verification, and encryption of user plane data.

FIG. 4 shows a methodology for key computation by a primary access point according to an embodiment of the invention. As shown, methodology 400 summarizes the key computation process that an MeNB performs (e.g., step 212 of FIG. 2) to generate an $SK_{eNB}$ when an offload operation is initiated between an UE and a target SeNB. Note that the subject UE performs the same key computation process (e.g., step 222). As described above, in one illustrative embodiment, parameters SCC and length of SCC 402, $MK_{eNB}$ 404, and other target cell parameters 406 (e.g., target PCI, length of PCI, EARFCN-DL, and length of EARFCN-DL), are used by KDF 408 to compute the key $SK_{eNB}$ 410 for the target SeNB. Note that while the other target cell parameters 406 (e.g., target PCI, length of PCI, EARFCN-DL, and length of EARFCN-DL) are used in the illustrative embodiment described herein, in alternative embodiments, one or more of these parameters may be excluded.

FIG. 5 shows a methodology for key computations by a secondary access point according to an embodiment of the invention. As shown, methodology 500 summarizes the key computation processes that a target SeNB performs to generate various integrity and ciphering keys based on the $SK_{eNB}$ received from the MeNB when an offload operation is initiated between the UE and the target SeNB. That is, FIG. 5 shows the derivation methodology 500 of a full set of keys for the SeNB. Based on the architectural choice of whether RRC is present in SeNB or not, only necessary keys among $SK_{UPint}$, $SK_{UPenc}$, $SK_{RRCint}$ and $SK_{RRCenc}$ are derived and used. If RRC is present only in the MeNB, only the $SK_{UPint}$, $SK_{UPenc}$ keys are used for user plane integrity and encryption in the SeNB. The parameters: UP-enc-alg, Alg-ID; UP-int-alg, Alg-ID; RRC-enc-alg, Alg-ID; and RRC-int-alg, Alg-ID, for the SeNB are identifiers of algorithms (performable by the SeNB) selected at the MeNB via negotiation over the X2 interface (note that the X2 interface is the interface between the MeNB and the SeNB, and specifically the control plane of this interface is used). It is to be understood that the MeNB signals to the UE, via the RRC message, the same algorithm parameters for generation of a similar set of keys at the UE.

It is to be understood that both the SeNB and the UE can support more than one algorithm. In one example scenario, either the MeNB can send the list of UE algorithm parameters or the SeNB can send its algorithm parameters to the MeNB and the MeNB can make the choice of algorithm parameters based on its own negotiated selection between the UE.

Thus, as shown, the above-mentioned algorithm identifiers and SKeNB (502) are input to respective KDFs 504 (user plane integrity key generation), 506 (user plane encryption key generation), 508 (RRC integrity key generation), and 510 (RRC encryption key generation). The respective KDFs compute and output the respective integrity/ciphering keys $SK_{UPint}$ (512), $SK_{UPenc}$ (514), $SK_{RRCint}$ (516), and $SK_{RRCenc}$ (518) using their identified algorithm. In this illustrative embodiment, the computed keys are 256 bits in length, and are respectively truncated by truncation functions 520, 522, 524, and 526 to yield 128-bit versions of the respective integrity/ciphering keys $SK_{UPint}$ (528), $SK_{UPenc}$ (530), $SK_{RRCint}$ (532), and $SK_{RRCenc}$ (534).

Embodiments of the invention provide for mobile devices (e.g., UEs), communications network access points (e.g., eNBs), and other components described herein, to be implemented via respective computing devices. Such computing devices may be operatively coupled via communication network medium. The network medium may be any network medium across which the computing devices are operable to communicate. Embodiments of the invention are not limited to a particular type of network medium.

Figure 6:
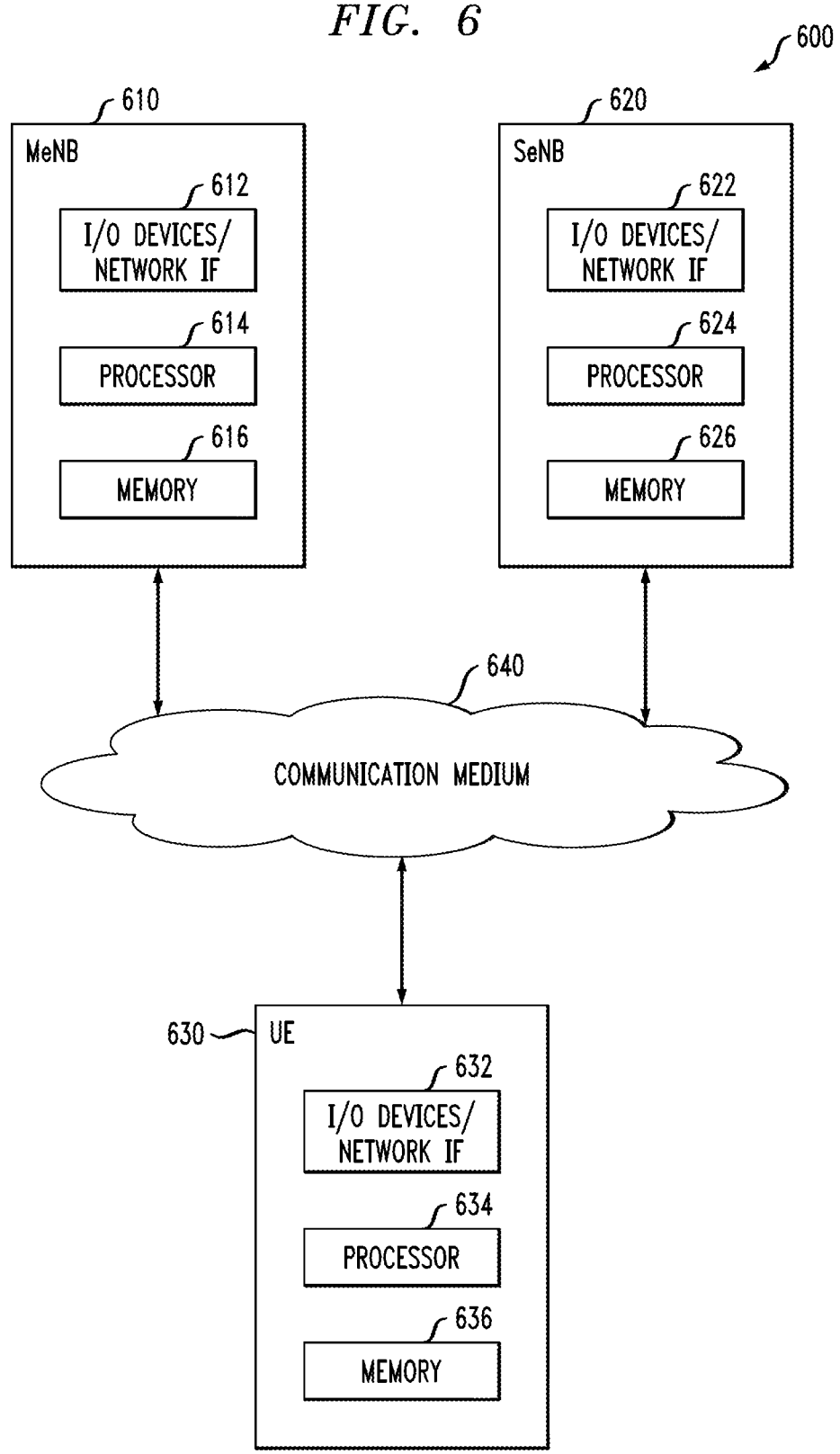
FIG. 6 shows a processing platform on which networks and methodologies according to one or more embodiments of the invention can be implemented.

For example, FIG. 6 illustrates a processing platform on which a communication network environment is implemented according to one or more embodiments of the invention. The processing platform 600 in this embodiment comprises a plurality of computing devices denoted 610, 620, and 630, which communicate with one another over a network 640. As illustrated, computing device 610 represents an MeNB (e.g., MeNB 204 in FIG. 2), computing device 620 represents an SeNB (e.g., SeNB1 206-1), and computing device 630 represents a UE (e.g., UE 202). Additional computing devices (not expressly shown) can be part of the communication network environment 600. One or more of the devices/elements of the communication network may therefore each run on one or more computers or other processing platform elements, each of which may be viewed as an example of what is more generally referred to herein as a "computing device." As illustrated in FIG. 6, such a device generally comprises at least one processor and an associated memory, and implements one or more functional modules for instantiating and/or controlling features of systems and methodologies described herein. Multiple elements or modules may be implemented by a single computing device in a given embodiment.

The computing device 610 in the processing platform 600 comprises a processor 614 coupled to a memory 616. The processor 614 may comprise a microprocessor, a microcontroller, an application-specific integrated circuit (ASIC), a field programmable gate array (FPGA) or other type of processing circuitry, as well as portions or combinations of such circuitry elements. Components of a system as disclosed herein can be implemented at least in part in the form of one or more software programs stored in memory and executed by a processor of a processing device such as processor 614. Memory 616 (or other storage device) having such program code embodied therein is an example of what is more generally referred to herein as a non-transitory processor-readable (or computer-readable) storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 616 may comprise electronic memory such as random access memory (RAM), read-only memory (ROM) or other types of memory, in any combination. The one or more software programs when executed by a computing device such as the computing device 610 causes the device to perform functions associated with one or more of the components/steps of system/methodologies 200, 300, 400 and/or 500. One skilled in the art would be readily able to implement such software given the teachings provided herein. Other examples of processor-readable storage media embodying embodiments of the invention may include, for example, optical or magnetic disks.

Also included in the computing device 610 is I/O devices/network interface circuitry 612. I/O devices include one or more input devices (e.g., keyboard, keypad, mouse, touchscreen, etc.) for inputting data to the computing device, as well as one or more output devices (e.g., computer display, screen, graphical user interface, etc.) for providing results associated with the computing device. The network interface includes circuitry which is used to interface the computing device with a network (e.g., 640) and other network components (e.g., 620 and 630). Such circuitry may include conventional transceivers of a type well known in the art.

The other computing devices 620 (with I/O devices/network interface 622, processor 624, and memory 626) and 630 (with I/O devices/network interface 632, processor 634, and memory 636) of the processing platform 600 are assumed to be configured in a manner similar to that shown for computing device 610 in the figure.

Although certain illustrative embodiments are described herein in the context of communication networks and systems utilizing particular communication protocols, other types of networks and systems can be used in other embodiments. As noted above, the term "network" or "system" as used herein is therefore intended to be broadly construed. Further, it should be emphasized that the embodiments described above are for purposes of illustration only, and should not be interpreted as limiting in any way. Other embodiments may use different types of network, system, device and module configurations, and alternative communication protocols, process steps and operations for implementing security context functionality. The particular manner in which the user devices and network nodes communicate can be varied in other embodiments. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method, comprising:
    establishing a first security context between a given user computing device and a first network computing device to enable a secure data connection between the given user computing device and the first network computing device; and
    establishing at least a second security context between the given user computing device and at least a second network computing device to enable a secure data connection between the given user computing device and the second network computing device simultaneous with the secure data connection between the given user computing device and the first network computing device, wherein establishment of the second security context comprises the first network computing device sending the given user computing device a simultaneous secure data connection parameter useable by the given user computing device to establish the second security context with the second network computing device;
    wherein the simultaneous secure data connection parameter comprises a counter that is set to a unique predetermined value for the second network computing device to enable the given user computing device to establish a unique security context for the secure data connection with the second network computing device.

2. The method of claim 1, wherein the first network computing device is associated with a first cell of a communications network and the second network computing device is associated with a second cell of the communications network.

3. The method of claim 2, wherein the given user computing device comprises user equipment (UE), the first network computing device comprises a Master Evolved Node B (MeNB) network access point, and the second network computing device comprises a Secondary Evolved Node B (SeNB) network access point.

4. The method of claim 1, wherein the first network computing device is associated with a first access point and the second network computing device is associated with a second access point.

5. The method of claim 1, wherein the simultaneous secure data connection parameter comprises a counter function that is configured to monotonically increase or monotonically decrease for each simultaneous data connection.

6. The method of claim 5, wherein the counter function, when configured to monotonically increase, equals an initial value incremented by one for the simultaneously-connected second network computing device, and is further incremented each time another network computing device is enabled by the first network computing device to establish another security context with the given user computing device.

7. The method of claim 6, wherein the counter function is reset to an initial value when the security context between the first network computing device and the given user computing device changes.

8. The method of claim 1, wherein establishment of the second security context further comprises computing a security key for the second security context using a key derivation function based on a security key established for the first security context and the simultaneous secure data connection parameter.

9. The method of claim 1, wherein establishment of the second security context allows for secure data offload from the first network computing device to the second network computing device.

10. An article of manufacture comprising a non-transitory processor-readable storage medium storing one or more software programs which when executed by one or more processors perform the steps of the method of claim 1.

11. An apparatus comprising one or more memories and one or more processors coupled to the one or more memories, and configured to perform the steps of the method of claim 1.

12. A method, comprising:
given a first security context established between a first network computing device and a given user computing device to form a secure data connection between the given user computing device and the first network computing device;
determining at the first computing device to initiate an offload operation;
causing establishment of at least a second security context between the given user computing device and at least a second network computing device to form a secure data connection between the given user computing device and the second network computing device simultaneous with the secure data connection between the given user computing device and the first network computing device, wherein the second security context is at least partially based on a simultaneous secure data connection parameter controlled by the first network computing device;
wherein the simultaneous secure data connection parameter comprises a counter that is set to a unique predetermined value for the second network computing device to enable the given user computing device to establish a unique security context for the secure data connection with the second network computing device.

13. The method of claim 12, wherein causing establishment of the second security context comprises the first network computing device computing a security key for the second security context based on a security key computed for the first security context and the simultaneous secure data connection parameter.

14. The method of claim 13, wherein causing establishment of the second security context comprises:
the first network computing device sending an offload request to the second network computing device with the computed security key for the second security context; and
receiving security algorithm parameters identifying a user plane encryption algorithm, a user plane integrity algorithm, a radio resource control encryption algorithm, and a radio resource control integrity algorithm, from the second network computing device.

15. The method of claim 13, wherein causing establishment of the second security context comprises the first network computing device sending the simultaneous secure data connection counter parameter and one or more parameters associated with the second network computing device to the user computing device to enable the user computing device to compute the security key for the second security context and compute one or more additional keys from the security key for the second security context, the one or more additional keys comprising integrity and ciphering keys.

16. An article of manufacture comprising a non-transitory processor-readable storage medium storing one or more software programs which when executed by a processor perform the steps of the method of claim 12.

17. An apparatus comprising a memory and a processor coupled to the memory, and configured to perform the steps of the method of claim 12.

18. A method, comprising:
given a first security context established between a first network computing device and a given user computing device to form a secure data connection between the given user computing device and the first network computing device, and given a determination at the first computing device to initiate an offload operation;
the given user computing device establishing at least a second security context with at least a second network computing device to form a secure data connection between the given user computing device and the second network computing device simultaneous with the secure data connection between the given user computing device and the first network computing device, wherein the second security context is at least partially based on a simultaneous secure data connection parameter controlled by the first network computing device and sent to the given user computing device;
wherein the simultaneous secure data connection parameter comprises a counter that is set to a unique predetermined value for the second network computing device to enable the given user computing device to establish a unique security context for the secure data connection with the second network computing device.

19. An article of manufacture comprising a processor-readable storage medium storing one or more software programs which when executed by a processor perform the steps of the method of claim 18.

20. An apparatus comprising a memory and a processor coupled to the memory, and configured to perform the steps of the method of claim 18.

* * * * *